United States Patent
Maltby

[15] 3,665,301

[45] May 23, 1972

[54] CAPACITANCE-TYPE MONITORING APPARATUS

[72] Inventor: Frederick L. Maltby, Jenkintwon, Pa.

[73] Assignee: Drexelbrook Controls, Inc., Glenside, Pa.

[22] Filed: Dec. 24, 1968

[21] Appl. No.: 786,663

[52] U.S. Cl..................................324/61 P, 324/61 B
[51] Int. Cl...................................................G01r 27/26
[58] Field of Search...............324/61, 61 B, 61 P, 61 M, 61 R; 356/38, 70

[56] References Cited

UNITED STATES PATENTS

| | | | |
|---|---|---|---|
| 2,449,072 | 9/1948 | Houghton | 324/105 X |
| 2,720,624 | 10/1955 | Gunst et al. | 324/61 |
| 2,764,892 | 10/1956 | Rosenthal | 324/105 X |
| 2,785,374 | 3/1957 | Fay et al. | 324/61 X |
| 3,083,565 | 4/1963 | Jennings et al. | 324/61 X |
| 3,264,557 | 8/1966 | Heeps | 324/61 X |
| 3,264,558 | 8/1966 | Heeps | 324/61 X |
| 2,269,584 | 1/1942 | Eldredge | 324/105 X |
| 3,200,312 | 8/1965 | Callahan | 324/61 X |

Primary Examiner—Rudolph V. Rolinec
Assistant Examiner—Ernest F. Karlsen
Attorney—Thomas M. Ferrill, Jr. and Roger Norman Coe

[57] ABSTRACT

Capacitance-type monitoring apparatus for determining the composition of fluid mixtures and detecting the presence and amount of organic impurities in an aqueous stream is disclosed.

6 Claims, 4 Drawing Figures

INVENTOR
Frederick L. Maltby
BY
ATTORNEYS

CAPACITANCE-TYPE MONITORING APPARATUS

BACKGROUND OF THE INVENTION

The present invention relates to capacitance-type monitoring apparatus for determining the composition of fluid mixtures and more particularly, to capacitance-type monitoring apparatus which is capable of continuously detecting the presence of minute concentrations of organic impurities, such as oil, in an aqueous stream.

During the past decade, a change has occurred in the public's attitude toward water pollution. Formerly, the tendency was to deplore such pollution but to regard it as one of the inescapable adjuncts of urban life. Now water problems are part of our national consciousness. There is a growing realization that water pollution, beyond being a vexatious nuisance, presents hazards to health and that waterways cannot be used indiscriminately as a dump for waste materials.

It is estimated, for example, that tankers foul the coasts of the world with spillage amounting to 500,000 tons of oil each year. Detergents employed to "solve" the problem of oil spillage from tankers often do more damage to beaches than the oil itself since minute marine and biological life are destroyed by such detergents.

Another example is the problem of "waste oil" — oil that has been used and must be either re-refined or dumped. One study has shown that in June 1966 alone, an estimated 20,000 gallons were discharged from a single sewage treatment plant into the Colorado River. This figure shows where much of the 350,000,000,000 gallons of used motor oil collected annually by filling stations is going - into the sewers.

Laws have been enacted to regulate the principal sources of water pollution, e.g., sewage treatment plants, the discharge streams of industrial plants, the discharge of oily ballast from tankers, passenger and cargo ships, etc. However, due to the lack of effective monitoring apparatus and the time required to have samples analyzed in a laboratory, compliance with laws designed to eliminate or reduce water pollution is often difficult. Another consequence of the lack of effective monitoring apparatus is that it is impossible to detect and prevent many of the violations which occur. For example, it is particularly difficult to detect violations which occur at night. It is also difficult to detect violations which occur when submerged discharge pipes are employed.

In general, apparatus suggested for detecting the presence and/or amount of an organic impurity, such as oil, in an aqueous stream have had one or more of the following drawbacks:

1. lack of sensitivity,
2. large physical size,
3. complex or difficult operation, and
4. expense.

With the possible exception of very large, complicated and expensive optical systems, optical inspection systems rely upon the use of a photocell and do not provide effective measurement sensitivity. In the optical systems normally suggested for the determination of oil content in an aqueous stream, the stream to be analyzed is agitated to produce emulsification of the oil in the water and then passed through a transparent pipe. A beam of light is passed through the transparent pipe and impinges upon a photocell. This system operates on the principle that the greater the quantity of oil in the water, the less the light impinging on the photocell. Thus, the photocell output is theoretically inversely related to the oil level in the water.

It has also been suggested that capacitance probe apparatus might be used to continuously measure the dielectric constant of a fluid mixture in a pipe since the dielectric constant or specific inductive capacity of an organic liquid differs from the dielectric constant of water. However, the ability of capacitance probe instruments to detect differences between organic and aqueous phases has been limited, for all practical applications, to instances where the medium is essentially either 100 percent organic or 100 percent water. It is impractical to measure the dielectric constant of streams containing a small amount of oil in tap water because such streams are basically conducting. The fact that dielectric constants change with temperature has further complicated the use of such capacitance probe apparatus. For example, at 0° C. the dielectric constant of distilled water is 88 while at 100° C. the dielectric constant of distilled water is 48.

SUMMARY OF THE INVENTION

An object of the present invention is to provide a relatively inexpensive capacitance-type monitoring apparatus which is capable of accurately detecting the composition of fluid mixtures independently of changes in temperature.

Another object of the present invention is to provide capacitance-type monitoring apparatus which is capable of accurately detecting and measuring the presence of minute quantities of one or more organic fluids in an aqueous stream.

Still another object of the present invention is to provide a reliable capacitance-type monitoring apparatus which measures the change in the capacitance caused by the deposition of a film of organic material onto a probe coated with a dielectric jacket.

In accordance with the present invention, a measuring probe is embedded in a solid dielectric jacket of hydrophobic material and immersed in a stream in which at least one organic impurity is to be detected. The dielectric coated measuring probe is connected to a remote high-frequency capacitance bridge circuit which provides a direct current output proportional to any change in capacitance, between the probe and conducting stream, caused by the thickness of the film coating the dielectric jacket of the probe.

The presence of an organic fluid impurity in an aqueous stream, for example, results in the deposition of a film of the organic fluid onto the dielectric coated probe — effectively separating the stream into an insulating layer and a conducting layer because of the hydrophobic characteristics of the surface coating the probe. It has been found that the thickness of the organic fluid film on the dielectric coated probe is dependent upon the magnitude of the organic fluid concentration in the aqueous stream. Any change in film thickness results in a change in the capacitance measured by the probe.

BRIEF DESCRIPTION OF THE DRAWINGS

Other objects, advantages, features and aspects of the invention will be more readily understood from the following detailed description of specific embodiments and examples thereof, when considered in conjunction with the drawings in which.

Figure 1:
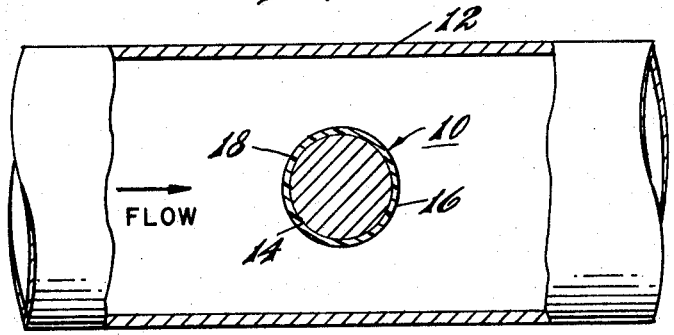
FIG. 1 is a schematic sectional view of a dielectric coated metal probe in a pipe line.

It should be understood that the dimensions in the drawings are greatly exaggerated for the sake of clarity of illustration.

DESCRIPTION OF THE PREFERRED EMBODIMENTS

Referring first to FIG. 1, a dielectric coated metal probe 10 is illustrated inside pipe line 12. Probe 10 comprises a measuring electrode 14, which is spherical in configuration, embedded in a solid dielectric jacket 16. The measuring electrode 14 is particularly responsive to the film of organic fluid which is deposited on the front or leading "edge" 18 of the probe 10. The aqueous stream flowing through pipe line 12 acts as the second electrode.

Figure 2:
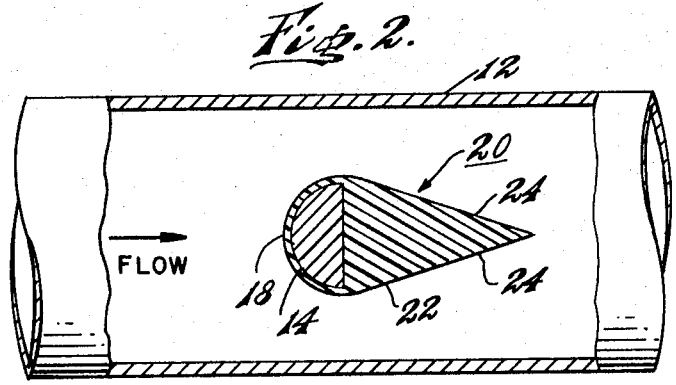
FIG. 2 is a schematic sectional view of another embodiment of a dielectric coated metal probe in a pipe line.
Figure 3:
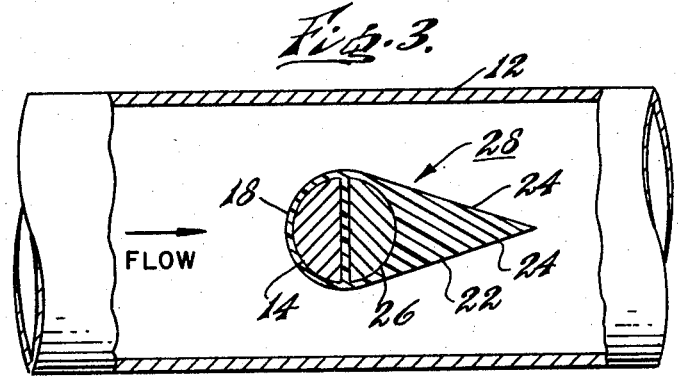
FIG. 3 is a schematic sectional view of two dielectric coated metal electrodes in a pipe line.

In FIG. 2, the dielectric coated metal probe 20 comprises a semi-circular electrode 14 embedded in a solid dielectric jacket 22 of a streamlined configuration. The shape of the electrode maximizes its responsiveness to the film which is deposited on edge 18. Since there is a tendency for organic fluid to also deposit on the aft or rear "side" 24—24 of probe 20, a grounded electrode 26 may be embedded inside the solid dielectric jacket 22 with the measuring electrode 14, as shown in FIG. 3. The presence of this grounded electrode 26 in the dielectric coated metal probe 28 (illustrated in FIG. 3) renders the measuring electrode 14 insensitive to any rearward deposition or accumulation of organic material. If desired, electrode 26 can be maintained at a guard potential by driving electrode 26 at the same potential as electrode 14, thereby eliminating any current between electrodes 14 and 26.

Figure 4:
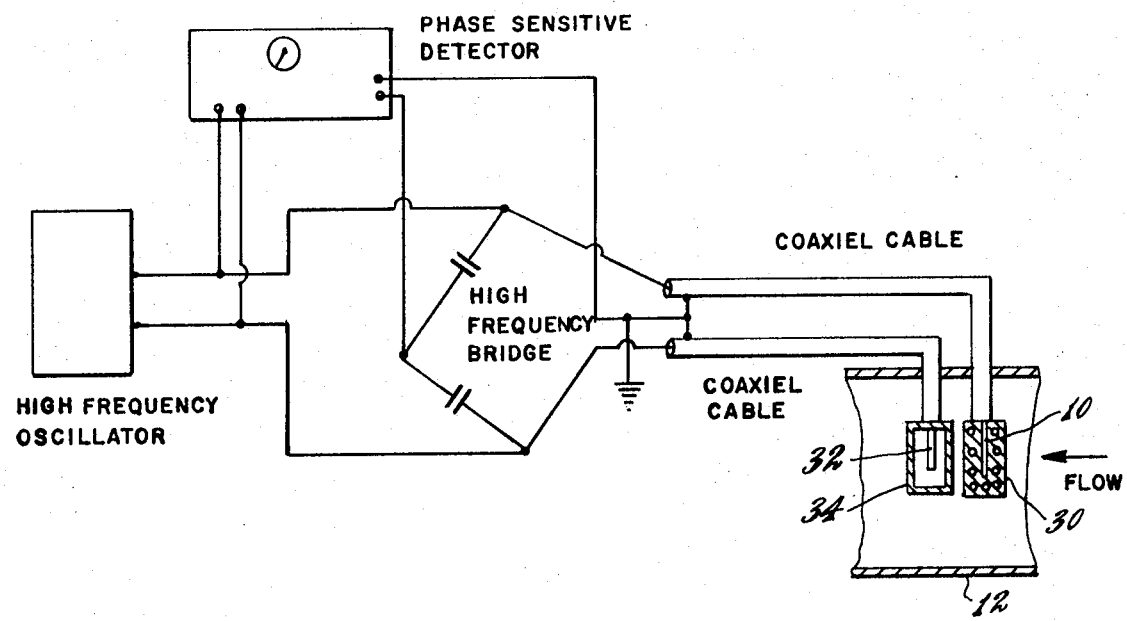
FIG. 4 is a schematic diagram of a high-frequency capacitance bridge circuit connected to a measuring probe and a compensating probe located in a pipe line.

FIG. 4 illustrates the use of two dielectric coated metal probes inside a pipe line 12. The measuring probe 10 is preferably surrounded by a grounded metal shield or "cage" 30. The capacitance measured by the measuring electrode of the measuring probe 10 varies with the thickness of the organic fluid film deposited on the dielectric jacket of the probe. A compensating probe 32 is located inside, and spaced from, a sealed metal jacket 34, which in certain applications can be filled with water. Both probes (10 and 32) experience the same temperature variations and hence equal capacitance when probe 10 is free of an organic film. These probes are connected by coaxial cables to a high-frequency capacitance bridge circuit comprising a high-frequency bridge, a high-frequency oscillator and a phase sensitive detector in known manner. Since the capacitance of the compensating probe 32 is independent of the concentration of organic fluid inside pipe line 12, the presence of such organic fluid in pipe line 12 causes the high-frequency bridge to become unbalanced. The presence and amount of the organic fluid in pipe line 12 is thus indicated by the resulting unbalanced current. Temperature compensation can alternately be provided by combining temperature sensitive capacitors to produce a similar capacitance versus temperature relationship.

If it is only desired to indicate the fact that the concentration is above or below a specified concentration, the two probes may be connected to a simple on-off control device. One example would be an oscillator circuit in which the oscillator would oscillate when one capacitor exceeded the other by a specified amount.

The solid dielectric jacket of the probes is preferably made from a material such as Teflon (polytetrafluoroethylene), Kel-F (polytrifluorochloroethylene) or a silicone material. Multiple layers of different materials can be used to form this dielectric jacket, provided the outer surface of the jacket is hydrophobic, i.e., water repellent. It is critical that the thickness between the dielectric jacket and the front "edge" of the measuring electrode be less then 30 thousandth of an inch. It is also essential, with respect to the accuracy of the probe, that the thickness of the dielectric jacket be uniform and that all air spaces between the dielectric jacket and the measuring electrode be eliminated. For these reasons, it is preferable to use a single layer of Teflon, stretched by the application of heat, to cover the measuring electrode and form the dielectric jacket.

The shape of the probe and the measuring electrode are also important. Preferably, the dielectric jacket of the probe is streamlined such that the rate of organic film which is deposited and washed off of the front surface of the probe is linear with the flow of the stream. The measuring electrode can be rendered particularly responsive to the film of organic fluid deposited on the leading "edge" of the probe by making the electrode approximately semi-circular in cross-section. The large amount of insulation on the downstream side makes the probe relatively insensitive to material accumulation. The sensitivity of the measuring electrode on the downstream side is even further reduced by employing a grounded electrode to shield the measuring electrode, as shown in FIG. 3.

Since the thickness of the film deposited on the dielectric jacket of the probe will be somewhat dependent upon stream velocity, for greatest accuracy the rate of flow should be maintained relatively constant. If desired, the probe can be mounted in a branch pipe supplied by a constant delivery pump. The use of a branch pipe is desirable not only in instances where variations in stream velocity occur, but also where the stream transmitted through the main pipe line is insufficient to fill the entire pipe.

The cage can be mounted around the dielectric coated measuring probe as shown in FIG. 4. The construction of this cage is such that it provides mechanical protection without interfering with the deposition of an organic film on the dielectric coated measuring probe. This is particularly desirable when solids are likely to pass through the pipe line in addition to the flow of fluids.

High-frequency capacitance bridge circuits which can be used in the present invention are well known in the art. It has been found, however, that a preferred circuit is the circuit disclosed in the Maltby patent, U. S. Letters Pat. No. 3,339,412, which is hereby incorporated by reference. In the Maltby patent, a high-frequency capacitance bridge circuit is connected to a capacitance probe for the measurement of the depth of a liquid in a container.

The capacitance-type monitoring apparatus of the present invention does not rely upon changes in electrical capacitance with the depth of a liquid material in a container or upon changes in the dielectric constant of fluid flowing through a pipe line. Instead, the present invention relies upon changes in the film thickness on the dielectric jacket of the probe for detecting the composition of a stream passing through a confined space. The presence and amount of essentially any organic fluid in a fluid mixture can be determined using the apparatus of the present invention. Nevertheless, the invention is of particular utility in detecting the presence and amount of traces of oil in an aqueous stream.

In the past, it has been essentially impossible to detect the presence of less than about 10 percent oil in an oil-water mixture. The following table illustrates readings which were obtained with various oil-water mixtures using the conventional capacitance probes of three different manufacturers.

OIL CONCENTRATION VS. MILLIAMPERE READOUT

|  | Capacitance Probe A | Capacitance Probe B | Capacitance Probe C |
|---|---|---|---|
| Air | 0.195 | 1.4 | 0.18 |
| 100% oil | 0.21 | 1.5 | 0.18 |
| 50% oil | 0.25 | 1.7 | 0.19 |
| 25% oil | 2.2 | 3.5 | 0.19 |
| 12.5% oil | 3.5 | 4.5 | 0.19 |
| 5% oil | 6.0 | 16.0 | 10.5 |
| 100% water | 7.0 | 17.0 | 10.5 |

While each of the three probes showed a response in the concentration range between 5 and 12.5 percent oil (evident by the sharp change in current reading), in the concentration range between 0 and 5 percent oil there was little or no change. In contrast, the capacitance-type monitoring apparatus of the present invention is approximately 15 times as sensitive. The apparatus of the present invention has been shown to provide a change as large as 3 micro micro farads for a change of 0 to 1.0 percent oil in the concentration of an oil-water mixture. Using instrumentation having a full scale of 1 micro micro farad, the present monitoring apparatus permits readings to be made as low as a few parts per million.

The capacitance-type monitoring apparatus of the present invention can provide monitoring information for direct readout or for recording devices. The apparatus can also be adapted to provide visual and/or audible alarms, actuate or stop pumps, or operate discharge or bypass valves.

Thus, capacitance-type monitoring apparatus is disclosed which can be used for the measurement and detection of liquid compositions. The equipment has an ultra sensitive measurement capability which is essential for detecting trace amounts of oil-water mixtures. Advantageously, the apparatus can be made intrinsically safe and can be used in explosion hazardous as well as corrosive areas. Moreover, the capacitance-type monitoring apparatus of the present invention, which has no moving parts, is rugged and relatively inexpensive.

While the invention has been described with particular emphasis on the detection of organic fluids, such as oil, in an aqueous stream, it will be understood that the capacitance-type monitoring apparatus can also be employed to determine the composition of various organic fluid mixtures. Other modifications may be made without departing from the invention.

What is claimed is:

1. Capacitance-type apparatus for determining the presence of minute quantities of organic fluids in a flowing aqueous stream by measuring change in capacitance resulting from changes in thickness of organic film coating the dielectric jacket of a measuring electrode, comprising a measuring electrode, wherein said measuring electrode is coated with a dielectric jacket of hydrophobic material and wherein the thickness of said dielectric jacket is less than 0.03 inch on a measuring surface of said electrode; a confined path for contacting a portion of a flowing aqueous stream with the measuring electrode being positioned so that the aqueous stream impinges in a perpendicular manner on the measuring surface of the measuring electrode covered with the dielectric jacket thereby forming a film coating of said organic fluids on the dielectric jacket; and means for determining changes in capacitance resulting from changes in thickness of film coating the dielectric jacket of the measuring surface of said measuring electrode.

2. Apparatus of claim 1 wherein the measuring electrode has a streamlined configuration.

3. Apparatus of claim 1 which further includes a grounded electrode associated with a measuring electrode to thereby improve the sensitivity of the measuring electrode.

4. Apparatus of claim 3 wherein the grounded electrode is maintained at a potential substantially identical with that of the measuring electrode.

5. The apparatus of claim 1 in which oil is the organic fluid in the aqueous stream.

6. The apparatus of claim 5 in which the aqueous stream contains not more than 1 percent of oil.

* * * * *